US006850025B1

(12) United States Patent
Paolantonio et al.

(10) Patent No.: US 6,850,025 B1
(45) Date of Patent: Feb. 1, 2005

(54) INTEGRATED ENCLOSURE AND CONTROLLER FOR VIDEO SURVEILLANCE CAMERA

(75) Inventors: James R. Paolantonio, Broward County, FL (US); Luis E. Anderson, Palm Beach County, FL (US); Mark A. Hauge, Palm Beach County, FL (US); Steven W. Schieltz, Palm Beach County, FL (US); John Douglas Wulf, Palm Beach County, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 819 days.

(21) Appl. No.: 09/609,176

(22) Filed: Jun. 30, 2000

(51) Int. Cl.[7] .............................................. G05B 19/40
(52) U.S. Cl. ....................... 318/685; 318/696; 318/599; 318/811; 348/143; 348/152; 348/211.14
(58) Field of Search ................................. 318/685, 696, 318/599, 811; 348/143, 152, 211.4, 211.6, 211.14

(56) References Cited

U.S. PATENT DOCUMENTS

| 4,320,949 A | | 3/1982 | Pagano .......................... 354/81 |
| 4,414,576 A | | 11/1983 | Randmae ...................... 358/229 |
| 4,974,088 A | * | 11/1990 | Sasaki ...................... 348/211.6 |
| 4,984,089 A | | 1/1991 | Stiepel et al. ................ 358/229 |
| 5,394,184 A | | 2/1995 | Anderson et al. ............ 348/151 |
| 5,517,236 A | | 5/1996 | Sergeant et al. ............. 348/143 |
| 5,627,616 A | * | 5/1997 | Sergeant et al. ............. 396/427 |
| 5,649,255 A | | 7/1997 | Schieltz ....................... 396/427 |
| 5,659,787 A | | 8/1997 | Schieltz .................. 395/200.56 |
| 5,689,304 A | | 11/1997 | Jones et al. .................. 348/373 |
| 5,801,770 A | * | 9/1998 | Paff et al. ................. 348/211.5 |
| 5,850,579 A | | 12/1998 | Melby et al. ................ 396/427 |
| 6,061,087 A | | 5/2000 | Schieltz et al. .............. 348/151 |
| 6,392,693 B1 | * | 5/2002 | Wakiyama et al. .......... 348/143 |
| 6,509,926 B1 | * | 1/2003 | Mills et al. .................. 348/143 |

FOREIGN PATENT DOCUMENTS

| EP | 0 977 430 | 2/2000 | .......... H04N/5/232 |
| WO | PCT/IB98/00482 | 4/1998 | .................... 3/194 |
| WO | PCT/IB99/00982 | 5/1999 | |

OTHER PUBLICATIONS

STMicroelectronics, L6258—PWM Controlled—High Current DMOS Universal Motor Driver, Apr. 2000.

\* cited by examiner

Primary Examiner—Rina Duda

(57) ABSTRACT

A controller for a video surveillance camera enclosure including a method and apparatus for controlling a stepper motor by decoding a command for a specific camera action, setting the state of a state machine, and instructing a position control process and a speed control process based upon the state of the state machine. A drive signal is send from said position control process to a motor current process and a phase control process to generate the current and phase signals to control the stepper motor. The stepper motor drive current is preferably a non-linear current. The speed control signal includes ramp up and ramp down speed control for gradually increasing motor speed and gradually decreasing motor speed, respectively. Another aspect of the invention detects a plurality of pan and/or tilt positions to reset the pan and/or tilt motor step count to a known count associated with a known location without the need to pan and/or tilt past a preselected home position. Another aspect controls a dome enclosure heater to operate over two different thermostat ranges to provide for manual de-fogging of the dome bubble.

20 Claims, 14 Drawing Sheets

INTEGRATED ENCLOSURE AND CONTROLLER FOR VIDEO SURVEILLANCE CAMERA

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to video surveillance cameras, and more particularly to an improved enclosure and mounting chassis for a video surveillance camera and improved operation and control for an associated pan and tilt video surveillance camera assembly.

2. Description of the Related Art

Presently, installation, set-up, and servicing of video surveillance camera enclosures, commonly called dome cameras, are relatively difficult and time consuming. Installation of the surveillance camera requires assembly of the camera chassis into the enclosure at the installation site to accommodate cable connection and data addressing. In addition, servicing of installed cameras often requires partial, if not complete disassembly of the camera chassis, which results in increased repair time and costs.

An improved video surveillance camera enclosure is desired, which reduces the time and costs associated with installation and service.

BRIEF SUMMARY OF THE INVENTION

One aspect of the present invention is an apparatus and method for controlling a stepper motor in a video surveillance camera dome that includes decoding a command for a specific camera action. Setting the state of a state machine based upon the decoded command. Instructing a position control process and a speed control process based upon the state of the state machine. The speed control process sends a speed control signal to the position control process. A drive signal is send from said position control process to a motor current process and a phase control process to generate the current and phase signals to control the stepper motor. The state machine can include a manual mode in which instructions to the position control process and the speed control process are the camera speed and direction. The state machine can include a target mode in which instructions to the position control process and a speed control process include a desired camera location. The stepper motor drive current is preferably a non-linear current. The speed control signal includes ramp up and ramp down speed control for gradually increasing motor speed and gradually decreasing motor speed, respectively.

A second aspect of the invention is an apparatus and method for detecting a plurality of pan positions in a stepper motor driven panable video surveillance camera of the type having a home sensor and detector to detect a home pan position and setting a pan motor step count to a known value at the home position. A plurality of position sensors and a home sensor are placed in a spaced relation on a slip ring assembly of the panable video surveillance camera. Each of the position sensors and the home sensor are detected by a detector positioned in a preselected location during panning of the video surveillance camera, each of the position sensors and the home sensor have an associated desired pan motor step count when they are detected. The pan motor step count is reset to the desired motor step count at each of the position sensor locations and the home sensor location when they are detected. During panning of the video surveillance camera where the camera is not panned through a full pan range of motion to detect the home sensor, at least one of the position sensors is detected and used to reset the pan motor step count to the desired pan motor step count. The difference between the desired pan motor step count and the pan motor step count is determined at each of the position sensor locations and the home sensor location when they are detected. The difference in the desired step count to the motor step count at each of the position sensor locations and the home sensor location is stored when detected. Resetting the pan motor step count to the desired motor step can be performed in a complex programmable logic device instead of a microprocessor to reduce delay errors.

A third aspect of the invention is an apparatus and method for detecting a plurality of tilt positions in a stepper motor driven tiltable video surveillance camera of the type having a home sensor and detector to detect a home tilt position and setting a tilt motor step count to a known value at the home position. A plurality of position sensors and a home sensor are placed in a spaced relation on a tilt assembly of the tiltable video surveillance camera. Each of the position sensors and the home sensor are detected by a detector positioned in a preselected location during tilting of the video surveillance camera, each of the position sensors and the home sensor have an associated desired tilt motor step count when they are detected. The tilt motor step count is reset to the desired motor step count at each of the position sensor locations and the home sensor location when they are detected. During tilting of the video surveillance camera where the camera is not tilted through a full pan range of motion to detect the home sensor, at least one of the position sensors is detected and used to reset the tilt motor step count to the desired tilt motor step count. The difference between the desired tilt motor step count and the tilt motor step count is determined at each of the position sensor locations and the home sensor location when they are detected. The difference in the desired step count to the motor step count at each of the position sensor locations and the home sensor location is stored when detected. Resetting the tilt motor step count to the desired motor step is performed in a complex programmable logic device instead of a microprocessor to reduce delay errors.

A fourth aspect of the invention is an apparatus and method for controlling a heater in a video surveillance camera housing by first measuring a temperature within the video surveillance camera housing. The heater element within the housing is deactivated if a first thermostat is active. The heater element is activated if a second thermostat is not active. The heater element is activated if the second thermostat is active and a heater timer is on. The heater element is activated and the heater timer is turned on if the second thermostat is active and a heater manual request is received, and the heater element is deactivated if the heater manual request is not received. The first thermostat and the second thermostat are active when the temperature goes higher than about 5 degrees above a first and a second set temperature, respectively.

Objectives, advantages, and applications of the present invention will be made apparent by the following detailed description of embodiments of the invention.

DETAILED DESCRIPTION OF THE INVENTION

Figure 1:
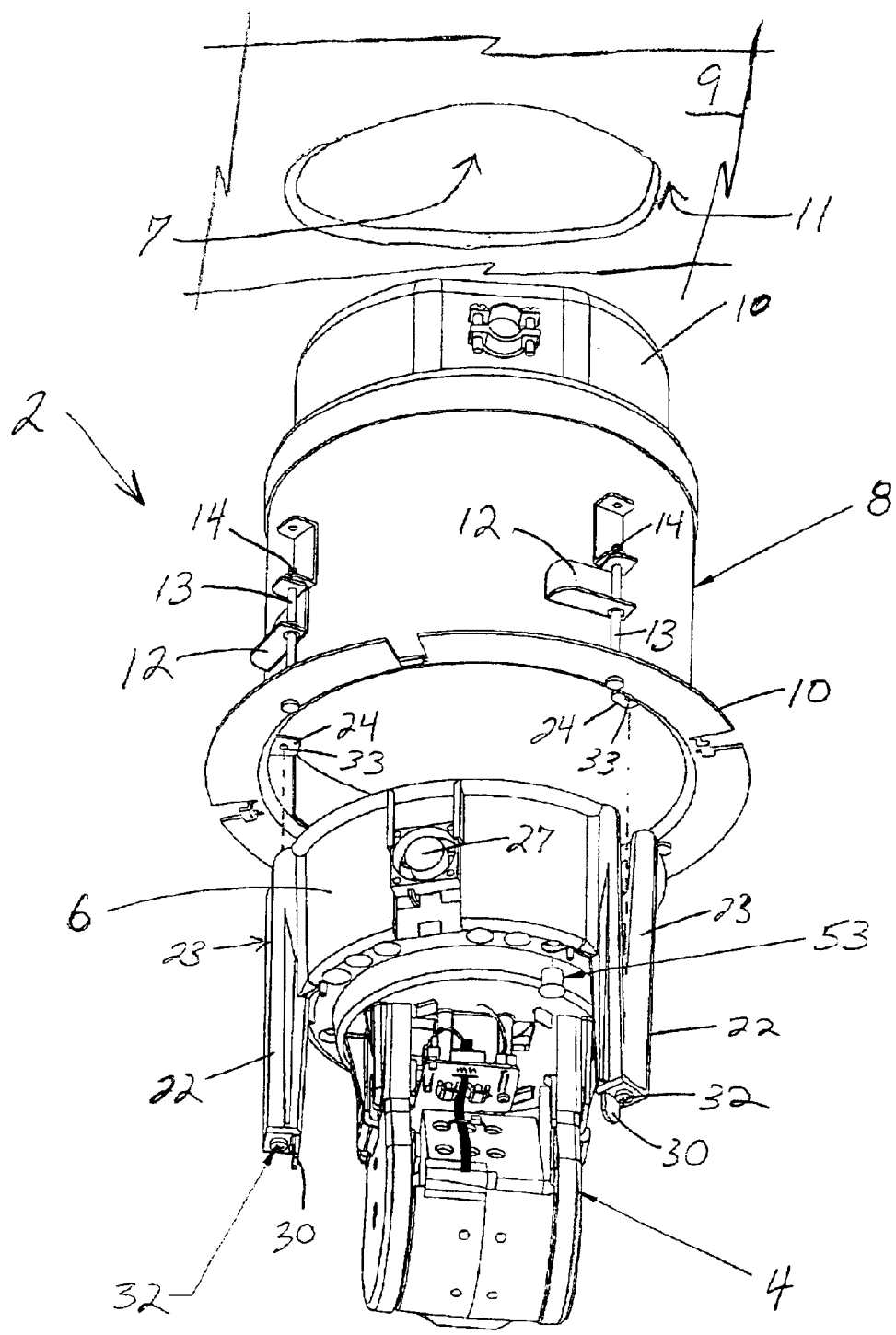
FIG. 1 is an exploded lower perspective view of one embodiment of the present invention.

Referring to FIG. 1, one embodiment of the present invention is illustrated at 2. Pan and tilt video camera assembly 4 is installed on video surveillance camera chassis 6. Chassis 6 is inserted into video surveillance camera housing 8 as illustrated and as fully described hereinbelow. Camera housing 8 is adapted to be inserted into a suitable opening in a ceiling (not shown). As illustrated in this example, housing 8 is shaped substantially like a cylinder and the corresponding opening in the ceiling must be substantially circular and sized large enough in diameter to receive housing 8 but smaller in diameter than flange 10. Flange 10 will thus rest against the lower surface of the ceiling at the perimeter of the opening when housing 8 is inserted therein. Housing 8 includes a plurality of mounting clamps 12 around the circumference of housing 8, each positioned on a threaded fastener 13. Mounting clamps 12 have a first position substantially flush with the exterior of housing 8 to facilitate insertion of housing 8 into the opening in the ceiling.

Figure 2:
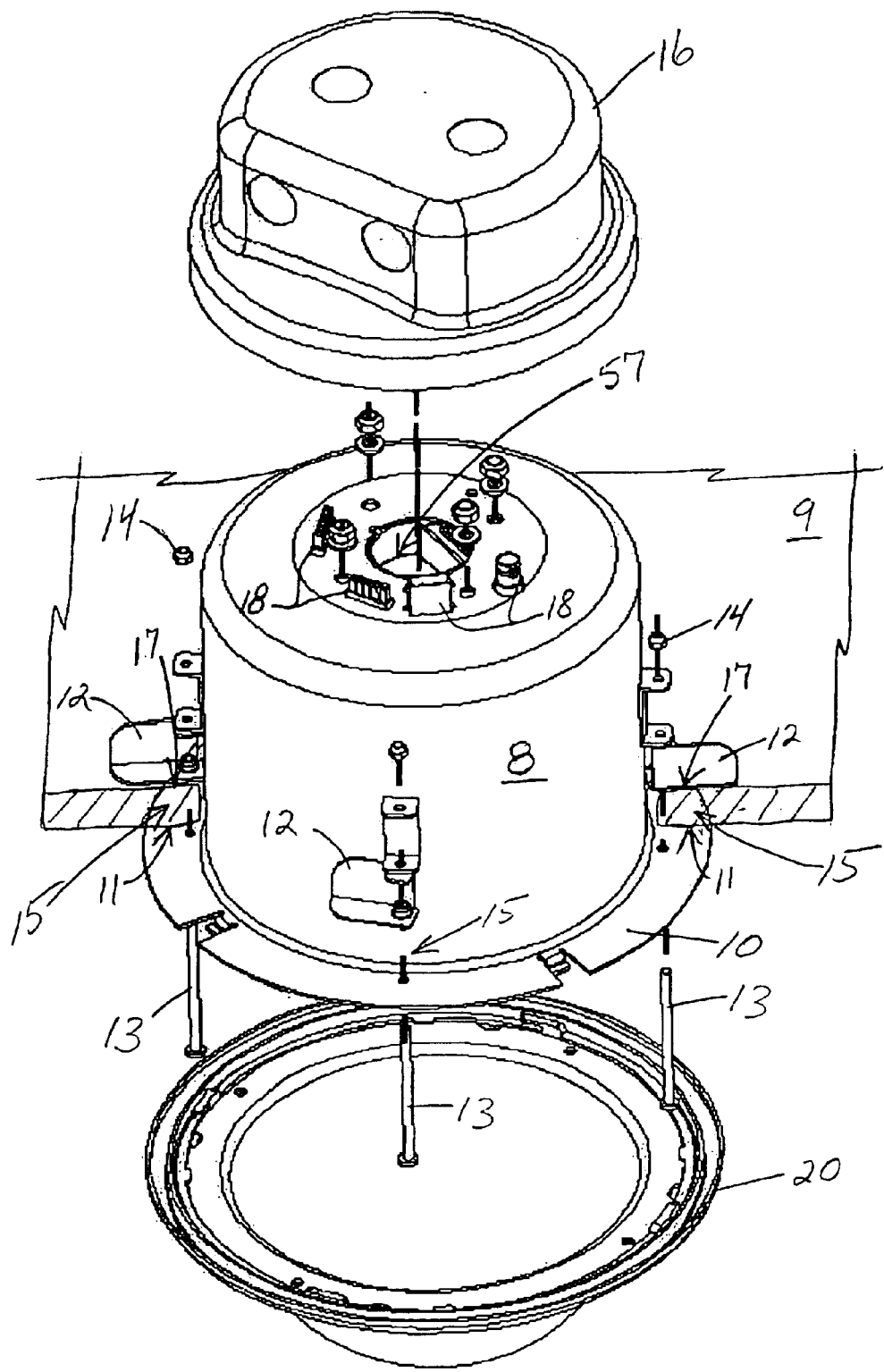
FIG. 2 is an exploded upper perspective view of one embodiment of the present invention.

Referring to FIG. 2, once housing 8 is inserted into the opening in the ceiling, threaded fasteners 13 are screwed into threaded nut 14 which moves mounting clamps 12 into a second position substantially perpendicular to housing 8 as illustrated. As threaded fasteners 13 are further screwed into nuts 14, mounting clamps 12 move closer to flange 10 and will engage the upper surface of the ceiling at the perimeter of the opening. The perimeter of the ceiling member adjacent the opening will be captured in the space 15 between flange 10 and mounting clamps 12, and can be secured therein with additional movement of mounting clamps 12 by further screw adjustment of fasteners 13. Cover 16 can be used to protect the upper portion of housing 8, including connectors 18, from potential dirt and debris in the ceiling, and as may be required by code in certain installations. As fully described hereinbelow, connectors 18 allow easy connection to the wiring of a video surveillance camera system, which can consist of one or more video monitors and/or one or more video recording devices (not shown). An optical quality dome cover or bubble 20, which can be injection molded, can be installed at the lower end of housing 8.

Referring again to FIG. 1, a plurality of positioning members 22 on chassis 6 assist in the installation of chassis 6 into housing 8. Positioning members 6 have a guide channel 23 that receives and engages corresponding alignment flanges 24 positioned on the interior of housing 8 to guide chassis 6 into housing 8. For reasons that will become apparent, positioning members 22 and alignment flanges 24 are adapted so that chassis 6 can only be inserted into housing 8 in one preselected orientation. In this example, three positioning members 22 unevenly spaced about chassis 6 are used with corresponding alignment flanges 24 to place chassis 6 in the desired preselected position within housing 8. However, it is envisioned that any number of positioning members 22 and alignment flanges 24 can be strategically mounted and used to guide chassis 6 into the desired position within housing 8.

Figure 3:
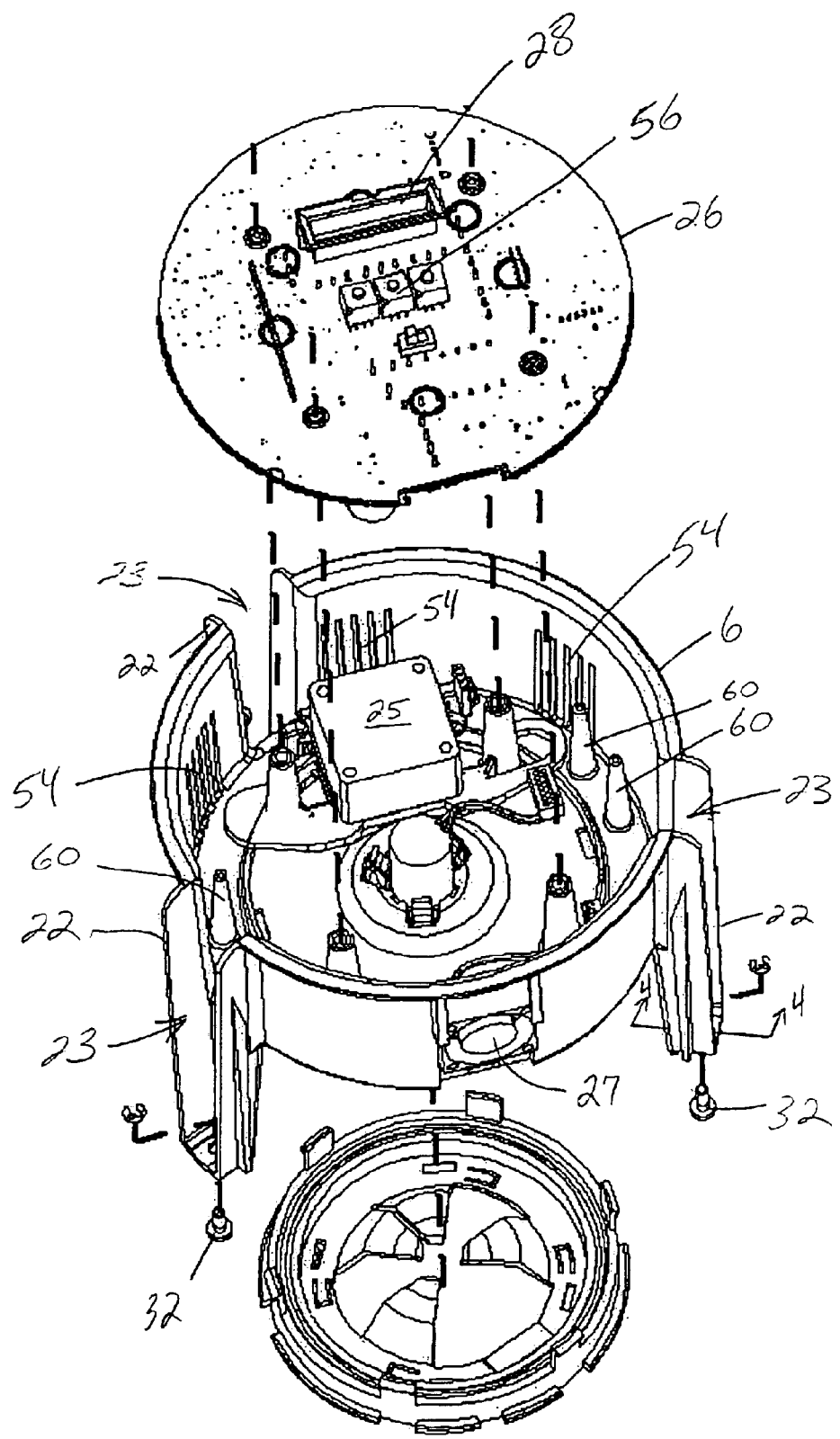
FIG. 3 is an exploded upper perspective view of one embodiment of the video surveillance camera chassis of the present invention.

Referring to FIG. 3, chassis 6 includes printed circuit board (PCB) 26 for interfacing pan and tilt camera assembly 4 and other electrical systems such as pan motor 25 and fan 27 to a video camera surveillance system. PCB 26 is connected to chassis 6 in a fixed orientation and includes blind mating connector 28, which mates with a second blind mating connector located on the inside of housing 8 (not shown). Blind mating connectors mate without the need for the installer to see the connectors.

Chassis 6 will typically be inserted into housing 8, after housing 8 has been installed in a ceiling. Housing 8 will be electrically connected to a video camera surveillance system via connectors 18. Chassis 6 is electrically connected to a second blind mating connector within housing 8, which is electrically connected to connectors 18. Positioning members 22 and alignment flanges 24 orient chassis 6 and PCB 26 so that blind mating connector 28 is properly aligned with the second blind mating connector within housing 8. If chassis 6 is pushed upward into housing 8 to mate blind mating connector 28 with the second blind mating connector on the interior of housing 8, the force is transferred directed to housing 8 and to the ceiling member to which housing 8 is attached. Too much force could be applied to the ceiling member, especially if the ceiling member is made of a fibrous tile typically used in drop ceilings. To prevent that occurring, each positioning member 22 includes a shoulder member 30, which engages each corresponding flange 24 to capture and suspend chassis 6 in a pre-connected, hands-free position prior to final connection as described below.

Figure 4:
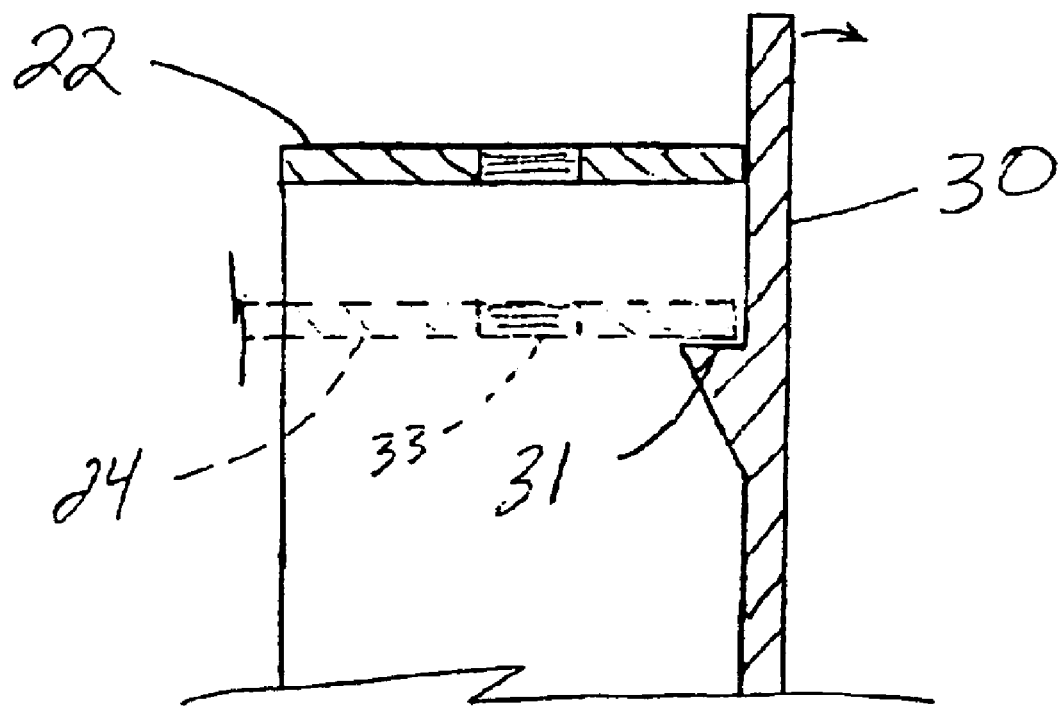
FIG. 4 is partial cross-sectional view taken along line 44 in FIG. 3.

Referring to FIG. 4, a cross-sectional view of a positioning member 22 illustrates shoulder member 30 having a shoulder 31 that engages flange 24 (shown in fantom). Shoulder members 30 can be biased against flange 24 and engage flanges 24 with an audible "click" so that an installer knows when chassis 6 is captured in place within housing 8. Once captured and suspended in the pre-connected position, threaded fasteners 32 thread into corresponding threaded apertures 33 in flanges 24, shown in FIG. 1. Upon tightening fasteners 32 into threaded apertures 33, chassis 6 is pulled further into housing 8 and blind mating connector 28 is mated with the second blind mating connector in the interior of housing 8 until fully seated. Therefore, the force of insertion of chassis 6 into housing 8 for final connection of the blind mating connectors, is not transferred to the ceiling, but is retained fully within housing 8 by fasteners 32 pulling into threaded apertures 33 and pulling chassis 6 into housing 8.

Figure 5:
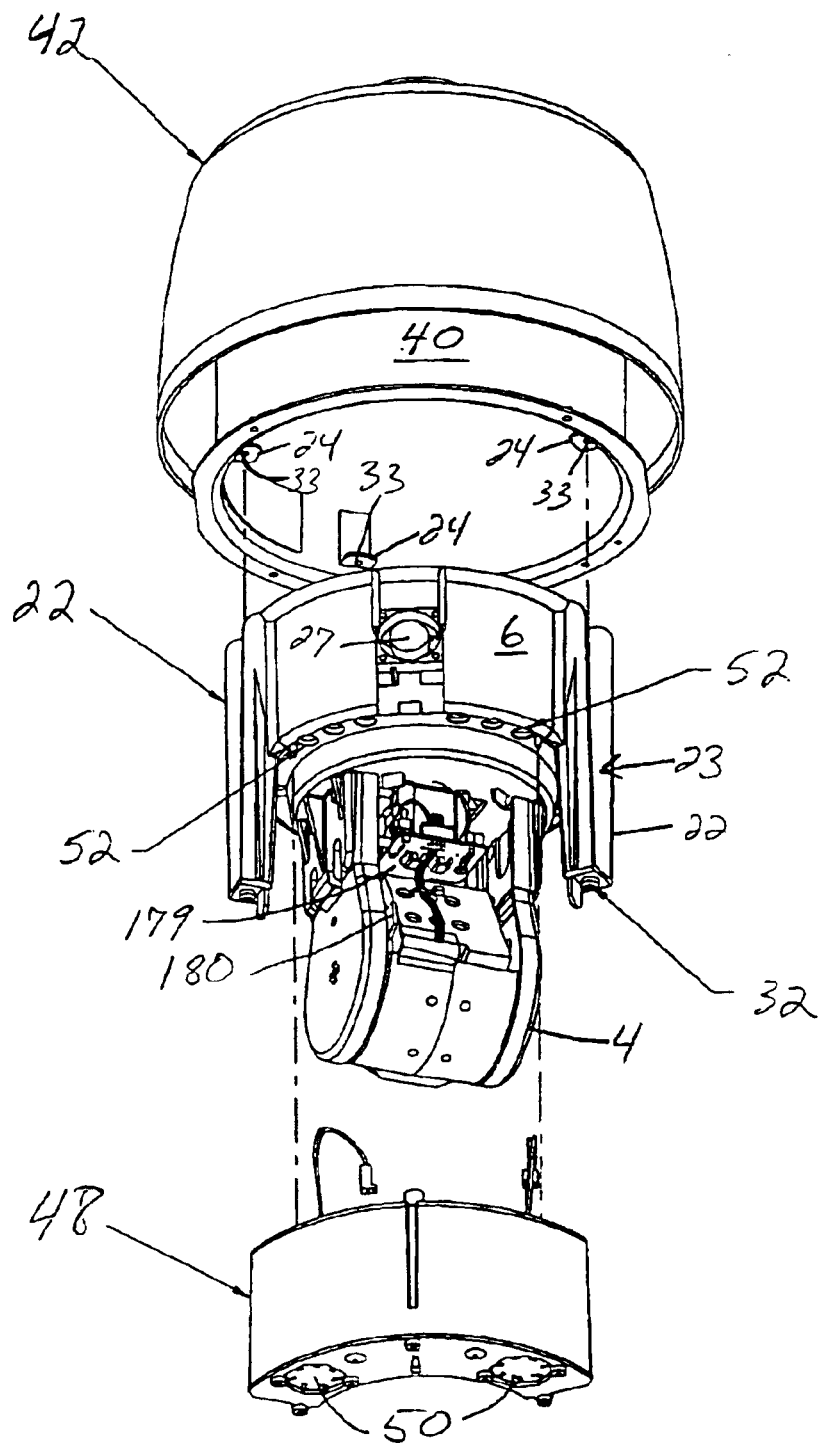
FIG. 5 is an exploded lower perspective view of an alternate embodiment of the present invention with heater for outdoor applications.
Figure 6:
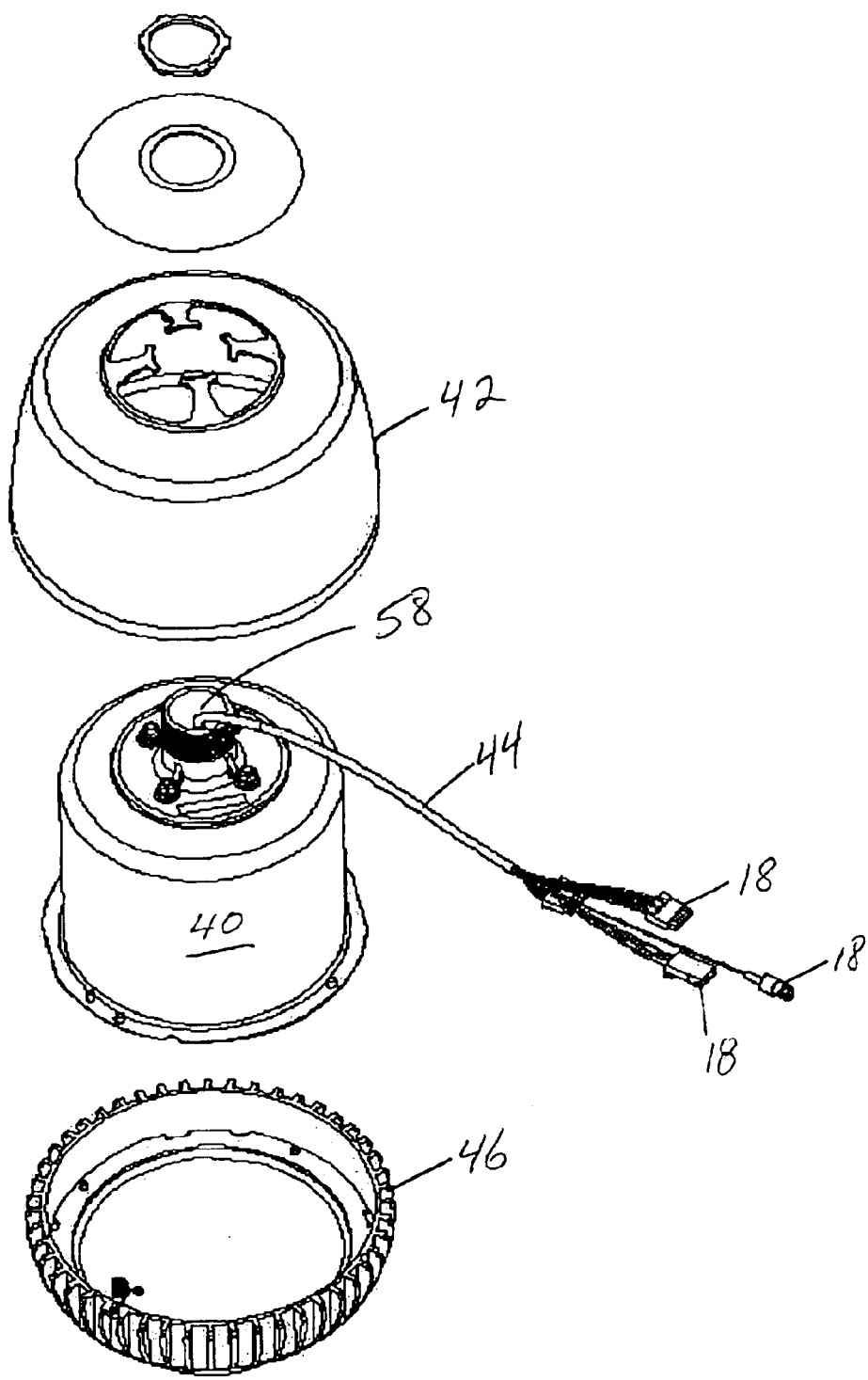
FIG. 6 an exploded upper perspective view of the embodiment of FIG. 5.

Referring to FIGS. 5 and 6, housing 40, which is identical to housing 8 except mounting clamps 12 are not needed, is installed in an enclosure 42 instead of being enclosed within a ceiling. Chassis 6 in inserted into housing 40 in the same manner as described above for housing 8. Connectors 18 are shown extending out of housing 40 as part of blind mating cable assembly or pigtail 44 and are not connected to the housing as shown in FIG. 2. Pigtail 44 extends from a blind mating connector within housing 40 (not shown) that connects to blind mating connector 28 on PCB 26. Pigtail 44 can be used in both housing 8 and housing 40 embodiments. In housing 8, pigtail 44 is coiled within housing 8 and all the connectors are mounted on housing 8, and in housing 40, pigtail 44 extends outside of housing 40 and only the blind mating connector is mounted within housing 40. Using pigtail 44 with both housing 8 and housing 40 embodiments reduces the number of inventory items required, and reduces manufacturing costs. Pigtail 44 extends through enclosure 42 and connectors 18 mate with connectors on the wiring harness of a video surveillance camera system. Optical quality dome bubble 46 can be installed at the lower end of housing 40.

Figure 7:
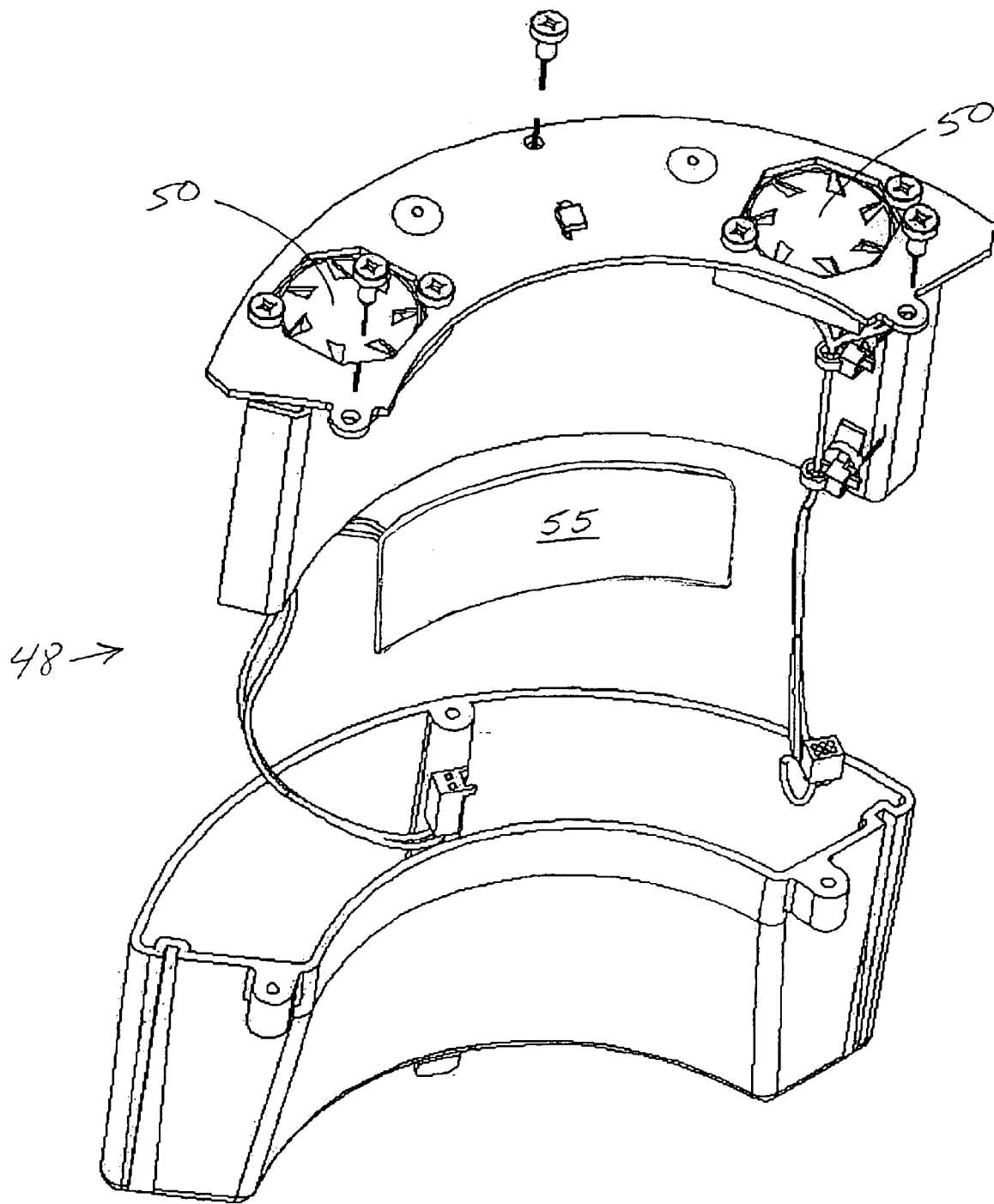
FIG. 7 is an exploded perspective view of the heater assembly used with the embodiment of FIG. 5.

Referring to FIG. 7, if enclosure 42 is used in an outdoor installation, fan and heater assembly 48 can be connected to chassis 6, as shown in FIG. 5. A plurality of apertures 52 on chassis 6 and fan 27 in conjunction with vents 54 (shown in FIG. 3) assist fans 50 with air circulation through chassis 6. Fans 50 circulate air across the interior surface of dome bubble 46, through apertures 52, across printed circuit board 26, across pan motor 25, and across thermostatically controllable heater 55. The air flow within housing 40 and across dome bubble 46 distributes heat evenly throughout housing 40, cooling the pan motor 25 and PCB 26 in warm weather, and defogging and deicing dome bubble 46 in humid and cold weather. The air flows unidirectionally in a similar manner to that disclosed in U.S. Pat. No. 6,061,087, the disclosure of which is incorporated herein by reference. With the improvement herein being that the air flows across the interior of the dome bubble, and across printed circuit board 26 and pan motor 25. Fan 27 assists fans 50 in the air flow across printed circuit board 26 and pan motor 25. Caps 53 as shown in FIG. 1 can be used to cap apertures 52 for indoor installations.

Referring back to FIG. 3, switches 56 are used to select the appropriate address for the video camera assembly 4 for proper interface with the video surveillance camera system. The video surveillance camera system may have many cameras and each must have a unique address for proper control and monitoring. During installation of the dome camera, switches 56 must be selected to correspond to the correct address for the particular dome camera placement within the video surveillance system. For enclosure 42, switches 56 are positioned on PCB 26 so that selection of the proper address can be selected through aperture 58. Therefore, enclosure 42, housing 40, chassis 6, and dome bubble 46 can be fully assembled at the factory, shipped, and installed without the need to disassemble to reach the switches 56 at the installation site. For ceiling mounted installations, the switches are also easily switched and the proper address selected through a suitable opening 57 in the top portion of housing 8, as shown in FIG. 2.

PCB 26 can include one or more LEDs (not shown), or other light emitting device, used for camera set-up and servicing. The LEDs can be different colors and/or positions. The LEDs must be viewed while the camera assembly 4 is energized and are positioned on the lower side of PCB 26. To enable an installer to view the LEDs from below the chassis 6 and camera assembly 4 when it is installed in housing 8 or housing 40, an LED view port 60 extends from adjacent each LED on PCB 26 to an unobstructed position on the lower side of chassis 6. The glow from the LED can thus be seen from below the installed camera assembly. The LED view port 60 can be funnel shaped as illustrated in FIG. 3 to more easily view the LED from below.

Figure 8:
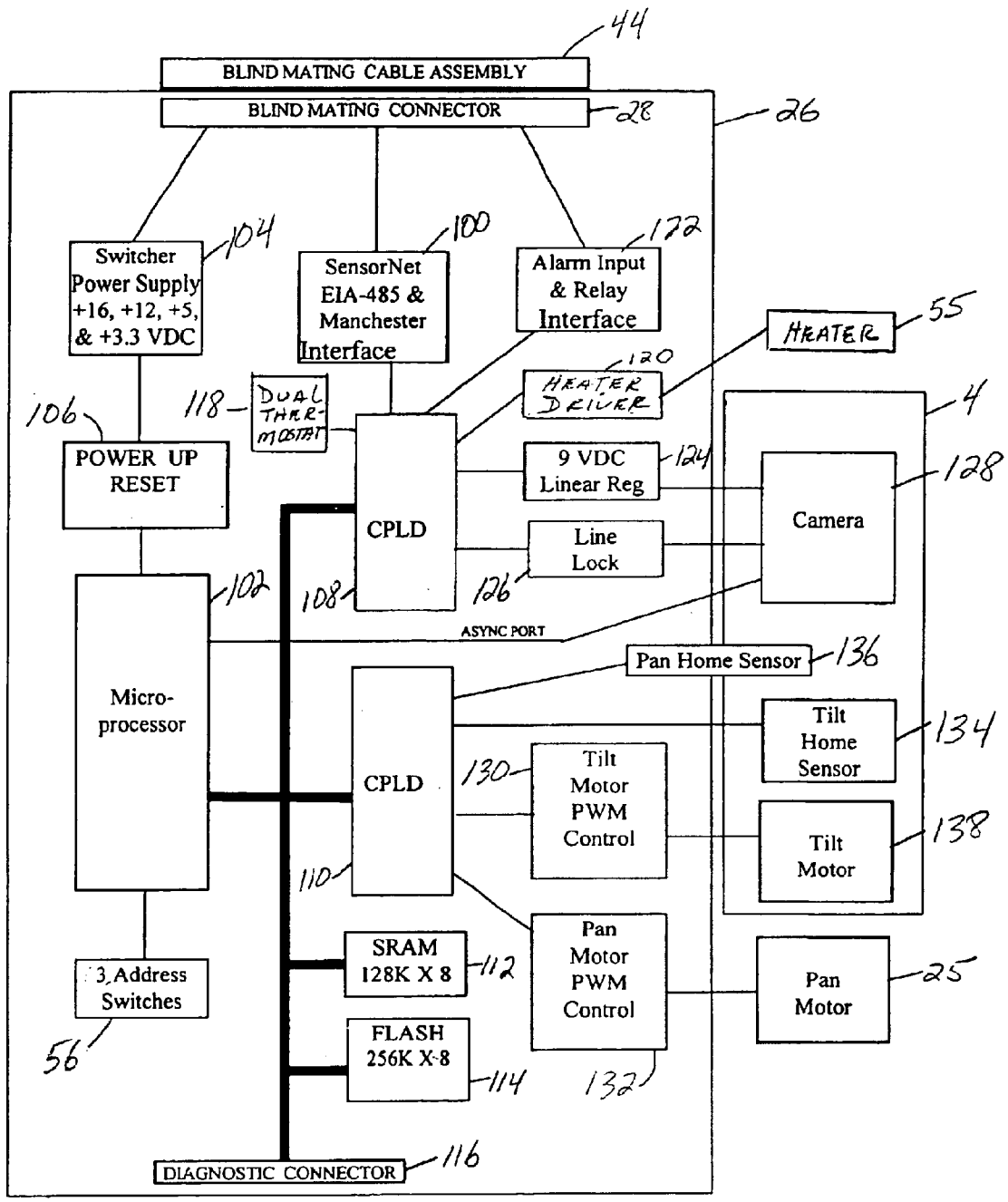
FIG. 8 is a block diagram of the controller for the present invention.

Referring to FIG. 8, a block diagram of the controller for the present invention is illustrated. Signals travel between the video surveillance camera system and PCB 26 through blind mating cable assembly/pigtail 44, which is connected to blind mating connector 28 as described hereinabove. Communications interface 100 automatically detects what data communications protocol is being transmitted to the camera dome and automatically configures the dome to operate according to the protocol received. Microprocessor 102 is powered by power supply 104, and is initialized by power-up reset circuit 106. One or more address switches 56 provide manual selection of an appropriate address for a particular installation. Microprocessor 102 decodes instructions from the video surveillance camera system and controls functions within the camera dome via bus connection to complex programmable logic device (CPLD) 108 and CPLD 110, to volatile SRAM memory 112, and to non-volatile flash memory 114. Microprocessor 102 is also connected to diagnostic connector 116, which enables diagnostic connection to the hardware and software resident on PCB 26. CPLD 108 is connected to dual thermostat 118, heater driver 120, which is connected to heater element 55, and further described hereinbelow. CPLD 108 is also connected to alarm input and relay interface 122, a 9 VDC regulator 124, and to line lock 126, which synchronizes camera 128 and other cameras (not shown) that may be in use in the video surveillance camera system. CPLD 110 is connected to tilt motor pulse width modulation (PWM) controller 130, pan motor PWM controller 132, tilt home sensor 134 and pan home sensor 136. Tilt motor PWM controller 130 is connected to tilt motor 138; pan motor PWM controller 132 is connected to pan motor 25. Tilt motor 138 and pan motor 25 are stepper motors. Camera 128, tilt home sensor 134, and tilt motor 138 are mounted on pan and tilt assembly 4.

Motor control logic within CPLD 110, which controls the pan and tilt camera movements and their pointing position, controls the stepper motors 138 and 25 with a method that provides smoother movement then would be provided by fully energizing each phase of the motors in sequence. CPLD controls tilt motor 138 and pan motor 25 by providing control signals to tilt PWM controller 130 and pan PWM controller 132, respectively. Pan and tilt PWM controllers 130 and 132 can be PWM universal motor drivers such as sold by STMicroelectronics, part number L6258. The motor control logic provides for each phase of the motors (138 and 25) to be slowly de-energized as the next sequential phase is gradually energized. This causes the motor armatures to be magnetically drawn to a point between the two electromagnetic phase poles of the motor. This point is determined by the intensities of the two electromagnetic poles. This technique is referred to as micro-stepping.

Figure 9:
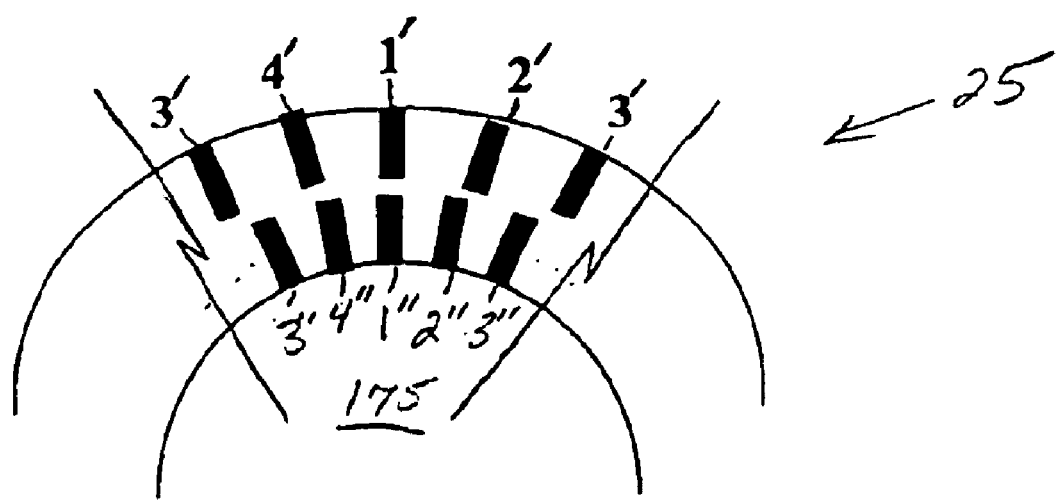
FIG. 9 is a partial view of the armature of a stepper motor used with the present invention.

Referring to FIG. 9, a portion of pan stepper motor 25 is illustrated. Tilt motor 138 is identical, and will not be separately described. Energizing the electromagnetic poles numbered 1', 2', 3', and 4', in the sequence 1', 2', 3', 4', 1', 2', 3', . . . the motor 25 will step in the forward direction. The sequence 4', 3', 2', 1', 4', 3', . . . will cause backwards rotation. The bars shown on armature 175 are iron poles 1", 2", 3", and 4" of armature 175 that are attracted to the electromagnetic poles 1' through 4' when the electromagnetic poles are energized. It should be understood that the sequence of electromagnetic poles and iron poles continue around the motor in a circle.

To illustrate clockwise or forward operation of the motor, electromagnetic pole 1' is energized so that it draws iron pole 1" as close as possible, until it is directly under it as shown. When pole 2' is energized, the iron pole 2" near it will be drawn in alignment with pole 2', and thus the motor will move one step. In micro-stepping, two poles are energized at the same time. If poles 1' and 2' are energized simultaneously, iron poles 1" and 2" and the armature 175 will be positioned somewhere between step 1 and step 2 depending on how much each pole is energized. The nature of magnetics provides a higher pulling force when the attracted objects (poles) are close and exponentially less when they are further away. By using a non-linear algorithm to energize and de-energize the motor poles, the motor movement can be made to be substantially linear. The non-linear algorithm also has the effect of making the motor torque uniform between micro-steps. By spreading the torque uniformly between micro-steps the ramped changes in motor speed, as described hereinbelow, are optimized to be as fast as possible for a given motor drive current.

Because motors 138 and 25 are stepper motors, camera pan and tilt position is determined by counting micro-steps of the motors from home sensor positions. The motor control logic synchronizes the micro-step count directly with the pan and tilt home position sensors 136 and 134 without going through the stepper motor control program which is located in microprocessor 102. By having the synchronization done directly by the motor control logic within CPLD 110, the inaccuracies caused by microprocessor processing delays are eliminated. The motor control logic of synchronizing the micro-step count is referred to as an auto-home feature.

The motor control logic within CLPD 110 includes integrity checks that watch for, and correct any missed steps causing the camera to not be pointing where expected. Missed steps can occur if a belt or gear jumps teeth, or if a motor is advanced or held up, which causes the motor armature not to advance in synchronization with the magnetic step changes. These anomalies can occur from something out of the ordinary, such as if the camera pan and tilt mechanism is bumped, jogged, or obstructed. The integrity check assures that the motors, and hence camera 128, are pointing correctly. The motor control logic within CPLD 110 provides exact return to a camera position by storing the micro-step position count of each motor 138 and 25 with respect to the home position. The position counts are read into microprocessor 102 and stored in non-volatile memory 114. By synchronizing to this reference upon subsequent turn-on, camera 128 pan and tilt positions can be returned to the exact micro-step count position. This allows camera 128 to return precisely to a defined micro-step position. In addition, operational errors can be stored in non-volatile memory 114. For example, tilt and pan positional errors can be stored. Errors can be stored in registers within the CLPDs, which are written to the non-volatile memory 114 when microprocessor 102 receives a reset command or detects a power fail condition. The stored information is beneficial in trouble-shooting problems and improving the reliability of the dome camera.

In operation, a camera may be pointed toward a particular sector that does not allow the camera to pass by the home position and home sensors. Multiple home sensors can be located at several positions on the pan and/or tilt mechanisms to permit detection when the pan and/or tilt mechanism does not pass through the home position. For example, during pan, the pan home sensor could be augmented with a plurality of detectable sensors, each positioned to be detectable during various sector scans, as fully described hereinbelow.

Figure 10:
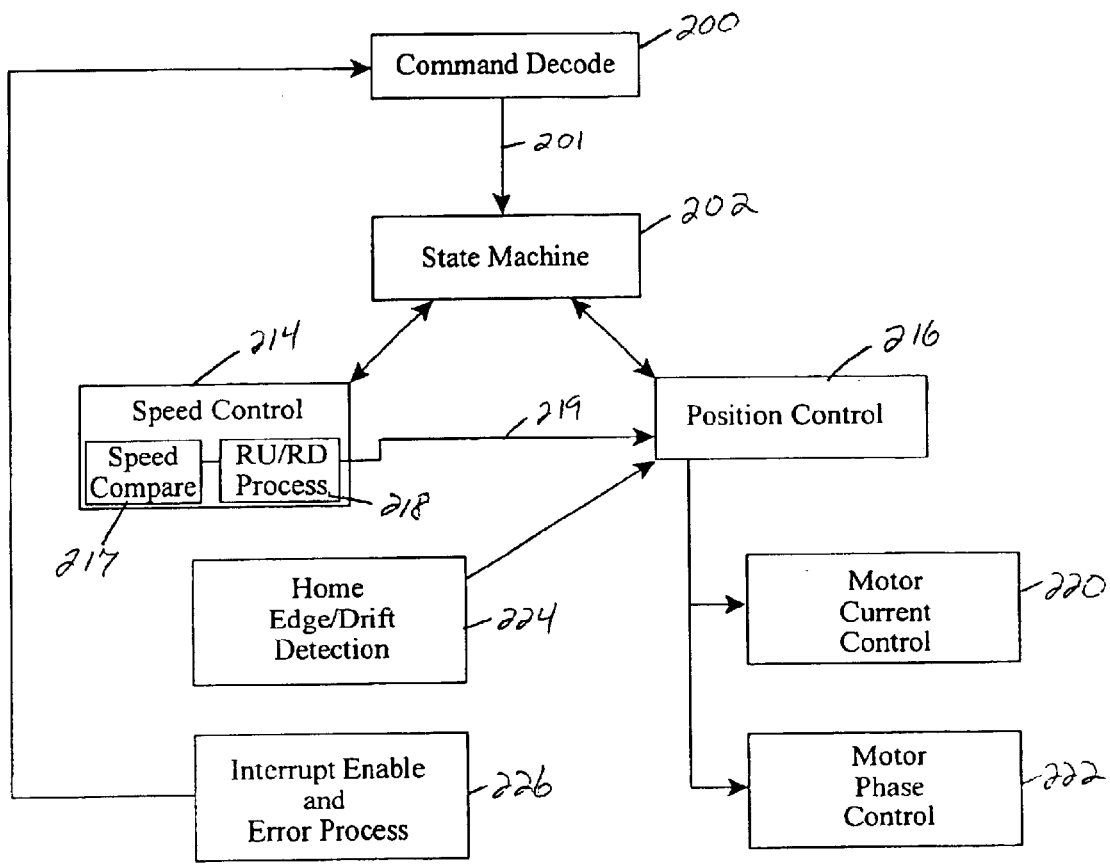
FIG. 10 is a flow chart of the logic control process for pan motor control.

Referring to FIG. 10, the programmed logic processes within CPLD 110 (shown in FIG. 8) for pan motor control are shown. The programmed logic processes for tilt motor control are analogous and will not be separately described. Command decode 200 decodes commands received from microprocessor 102. State machine 202 receives decoded commands 201 from command decode 200. The command 201 can be a manual mode command or a target mode command. In manual mode, an operator is manually controlling the camera such as with a joystick or track ball. In target mode, the camera is being instructed to proceed to a preselected position.

Figure 11:
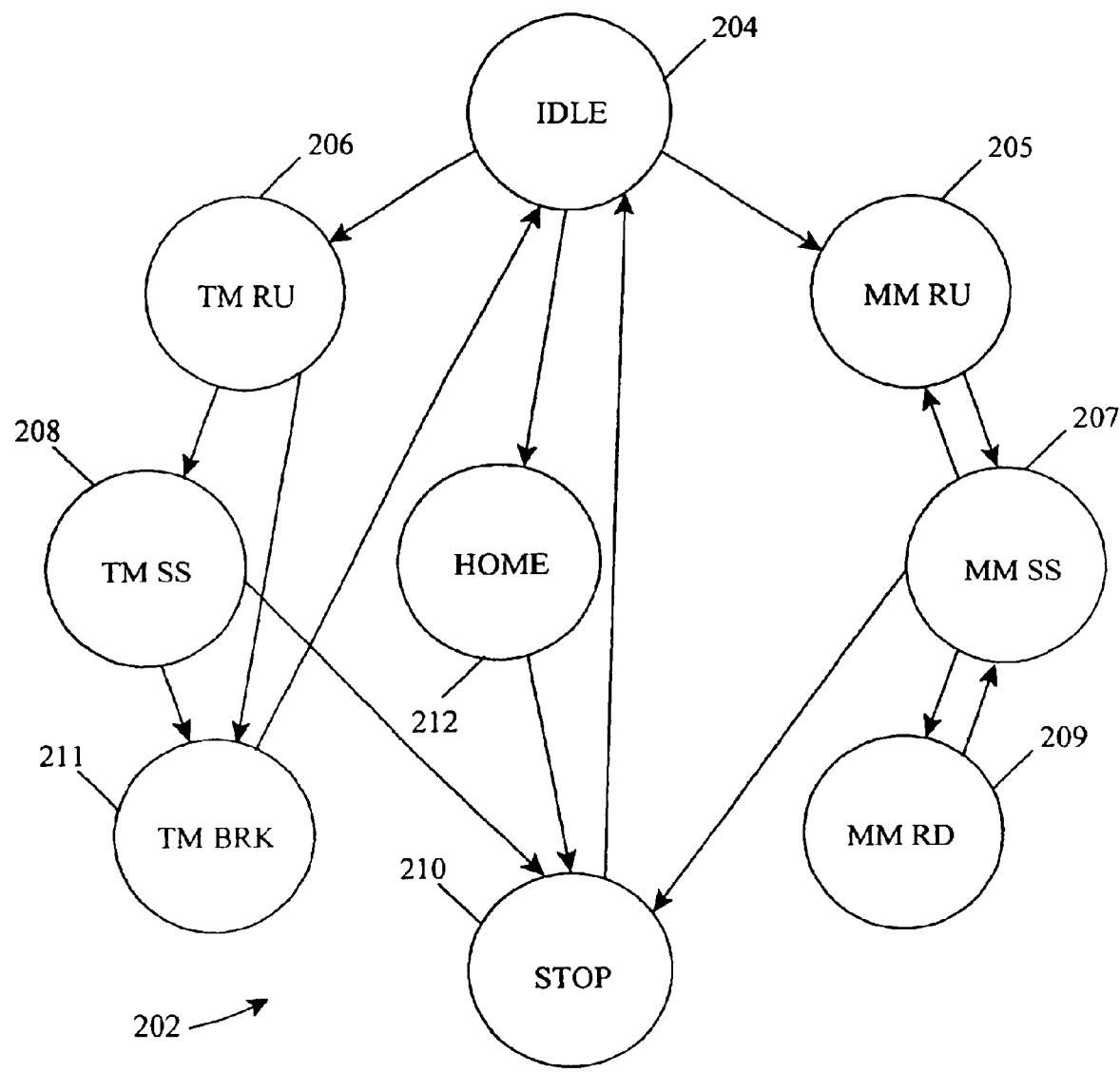
FIG. 11 is a block diagram of a state machine associated with that shown in FIG. 10.

The pan state machine 202 will be fully described referring to FIG. 11. The state machine will start at idle 204. The next state of state machine 202 will be either manual mode ramp up (MM RU) 205, target mode ramp up (TM RU) 206, or home mode 212. Ramp up means the motor will increase speed up to a steady state speed. If the motor is brought up to full speed too quickly, the motor can miss steps due to inertia. This effect occurs with all conventional stepper motors. Therefore, the motor speed is ramped up from stop or from a lower level to a higher steady state speed. From MM RU 205 and from TM RU 206 the next state for state machine 202 is manual mode steady state (MM SS) 207 and target mode steady state (TM SS) 208, respectively.

For manual mode commands, from MM SS 207, the next state is manual mode ramp down (MM RD) 209 or MM RU 205. MM RD 209 ramps the motor speed down from a first steady state speed to a second steady state speed, which is lower than the first steady state speed. As illustrated in FIG. 11, from MM SS 207, the speed can be ramped up at MM RU 205 or ramped down at MM RD 209, or stopped 210. After stop 210, the state machine 202 returns to idle state 204, to wait for a new command.

For target mode commands, from TM SS 208 the next state can be target mode break (TM BRK) 211. TM BRK 211 corresponds to a position that indicates that the target position is about to be reached and the motor must begin a ramp down to stop at the target position, and then returns to idle 204. Depending on how far the target position is from the current position, the steady state speed TM SS 208 may not be reached, and the TM RU 206 state will proceed directly to TM BRK 211. Upon initial power-up the motor is directed to the home position mode 212, and then goes to stop 210 and idle 204.

Referring again to FIG. 10, speed control process 214 and position control process 216 constantly monitor the state machine 202 for changes in state. When speed control process 214 receives ramp up and ramp down commands it compares the current speed at 217, which could be zero, with the desired speed, and transmits a speed control clock pulse 219 to position control process 216. Position control process 216 issues control signals to control the motor current 220 and motor phase 222, which control the motor position, speed, and direction. Position control process 216 receives a desired position, direction, and speed for target mode and a desired direction and speed for manual mode. Position control process 216 keeps track of the motor position by counting clock pulses 219. Motor current control 220 and motor phase control 222, which are part of CPLD 110, send the motor control signals to pan motor PWM control 132, as shown in FIG. 8. As fully described hereinabove and with reference to FIG. 9, the motors are driven with a non-linear drive current, which results in an even distribution of torque and optimizes the speed and smoothness of the motor.

Home edge/drift detection 224 receives a signal from pan home sensor 136 each time the home position is detected and sends a signal to position control process 216. If the pan home position is defined as step/micro-step 0, every time home detector 224 signals that the pan home sensor 136 has detected the home position, position control 216 should be at step count 0. If position control process 216 is not at the correct home step count, the step count is reset to 0, and the step error is sent to microprocessor 102 to log the step error in non-volatile memory 114.

Figure 12:
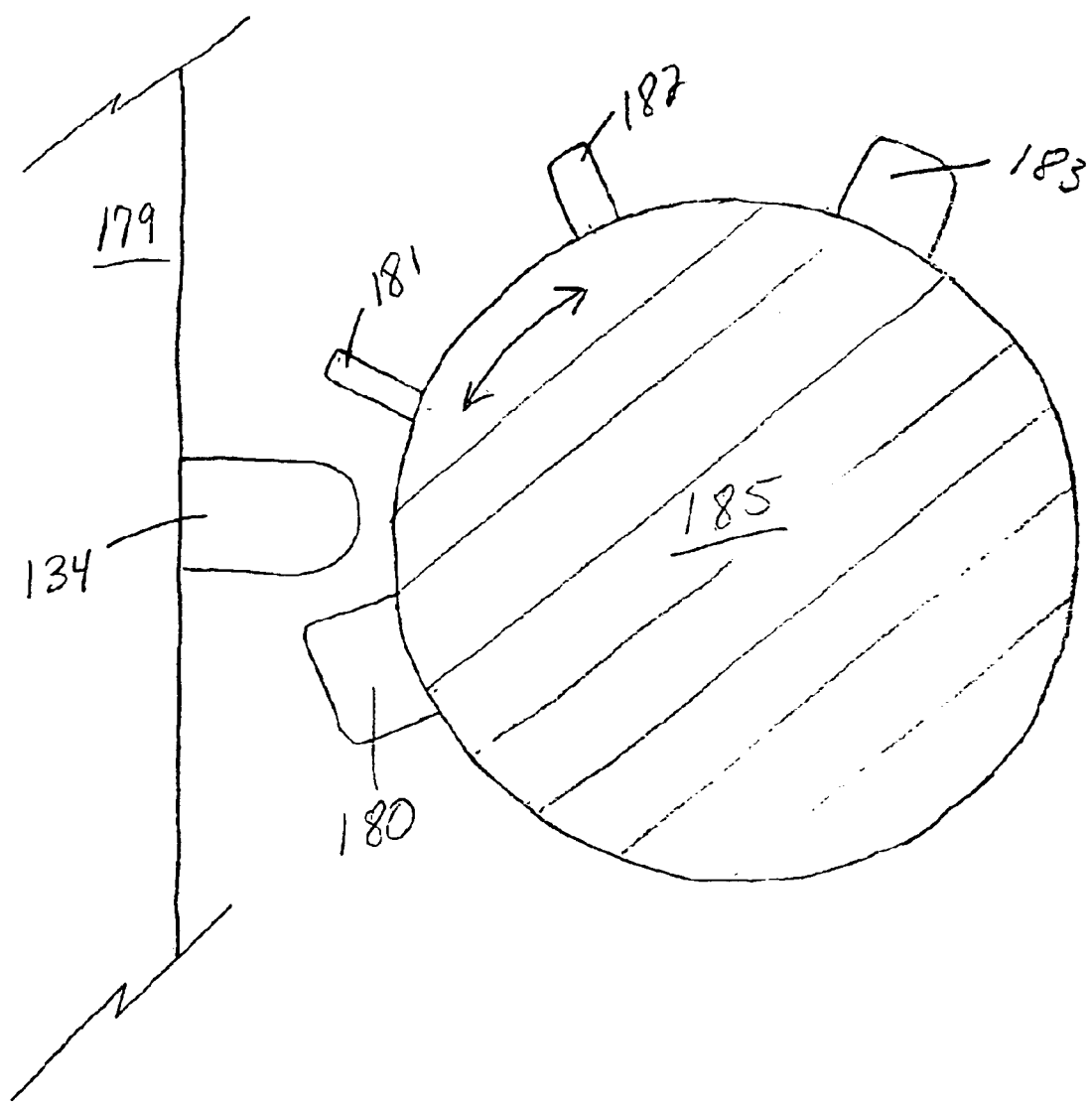
FIG. 12 is a partial view of the tilt assembly and tilt home sensor used with the present invention.

Referring to FIG. 12, one embodiment for tilt home sensor 134 is illustrated mounted on printed circuit board 179, along with position tabs 180, 181, 182, and 183 on a portion of tilt assembly 185. Position tab 180 and printed circuit board 179 are also illustrated in FIG. 5. In this embodiment, tilt home sensor 134 is photo sensor that senses when a tab 180–183 passes through a beam of light that is incident on sensor 134. Home tabs 180 and 183 can be identified because they are larger in size than tabs 181 and 182, and break the beam of light for a longer period of time. Tabs 181 and 182 are sized differently from each other, as are tabs 180 and 183 so that sensor 134 can differentiate each tab. Home tab positions 180 and 183 will be assigned a specified micro-step count corresponding to a tilt of 0 degrees to 90 degrees. Smaller position tabs 181 and 182 are used to detect a known tilt position (micro-step) that is intermediate of home tabs 180 and 182 so that the position of tilt motor 138 can be verified when it is tilted through a small sector. The position of motor 138 can be verified even if kept in a small sector and not tilted through home for a period of time. Any number and size of position tabs can be placed upon tilt assembly 185.

Figure 13:
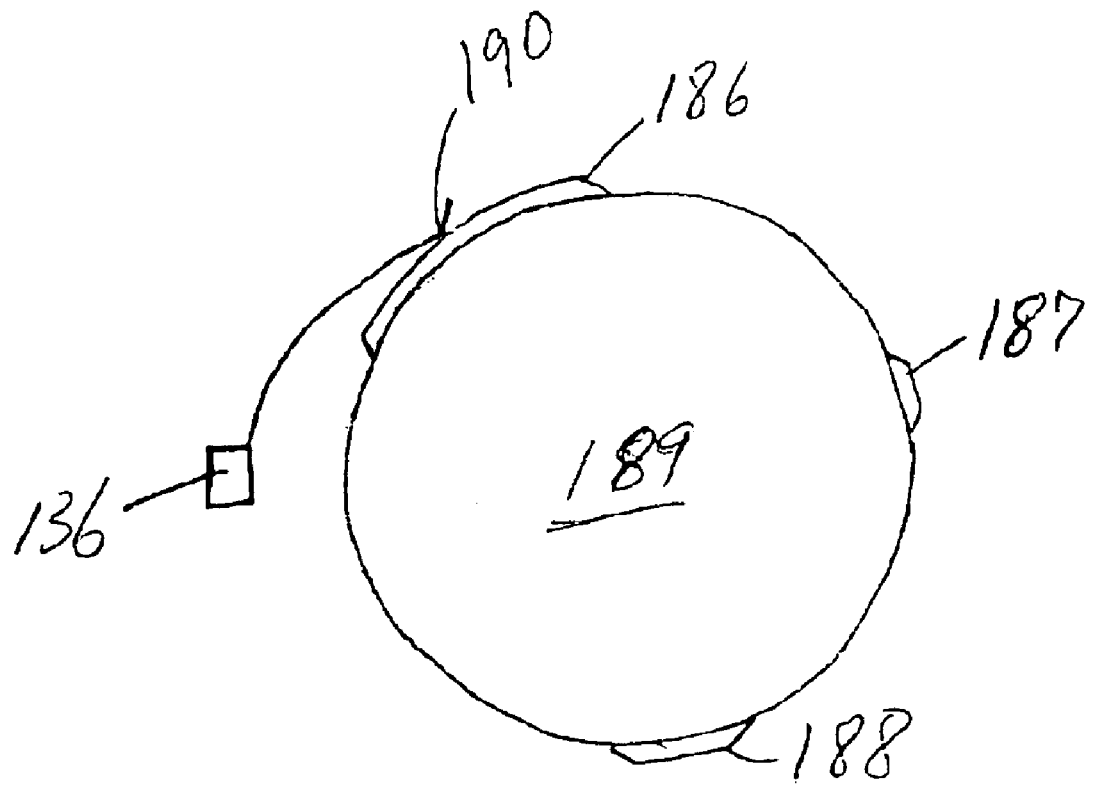
FIG. 13 is a partial view of the pan slip ring assembly and pan home sensor used with the present invention.

Referring to FIG. 13, one embodiment for pan home sensor 136 is illustrated along with slip ring sections 186, 187, and 188 on a portion of pan slip ring assembly 189. In this embodiment, pan home sensor 136 can have one or more armatures 190 that are biased onto slip ring assembly 189. Pan home sensor 136 detects when armature 190 makes contact with slip ring sections 186, 187, and 188. Slip ring sections 186, 187, and 188 can be conductive sections mounted upon a nonconductive region of slip ring assembly 189. Alternately, slip ring sections 186, 187, and 188 can be nonconductive sections mounted upon a conductive region of slip ring assembly 189. Slip ring section 186 is larger than slip ring sections 187 and 188 to indicate the true home position, and slip ring sections 187 and 188 are different in size so that sensor 136 can differentiate each position. Slip ring sections 187 and 188 are used to verify the position of pan motor 25 when it does not pass through the true home position, such as during sector scanning through a sector of less than 360 degrees.

Interrupt enable and error process 226 sends interrupts to microprocessor 102 for various preselected error and status conditions. For example, when a pan or tilt home position error is detected, an interrupt will be generated telling the microprocessor 102 to store the step error in non-volatile memory 14. Interrupts can also be generated for status of the motors, such as when the pan or tilt motor stops.

Figure 14:
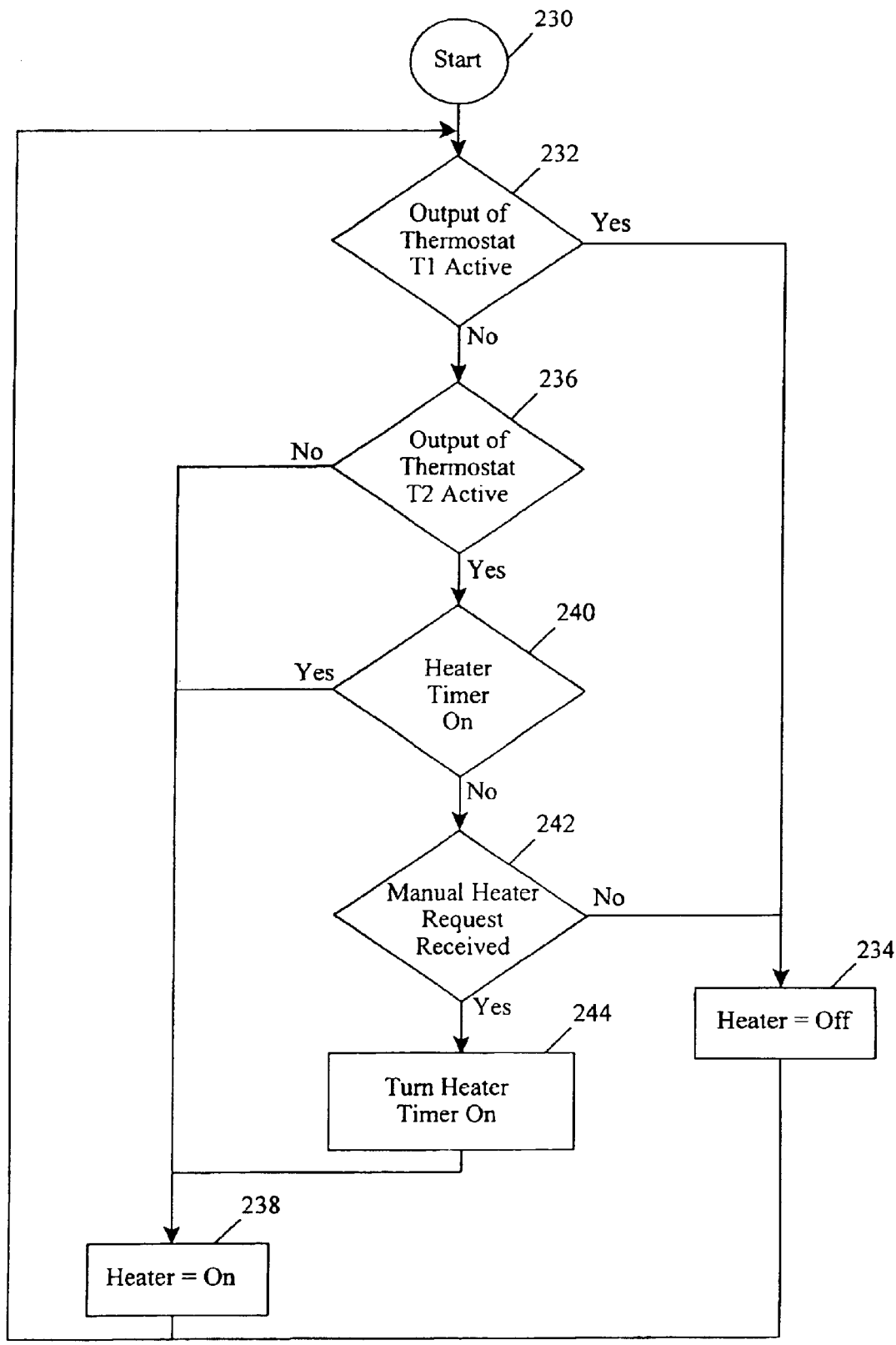
FIG. 14 is a flow chart for the heater control program of the present invention.

Referring to FIG. 14 and again to FIG. 8, the heater control program within CPLD 108 for reading dual thermostat 118 and controlling heater driver 120, which turns on heater element 55 will now be described. Once the program is initialized at 230, the status of thermostat T1 is checked at 232, if the temperature is above a selected maximum temperature, the heater is turned off at 234. T1 can be set to prevent the dome from becoming too hot. Thermostat T1 and T2 will go active when the temperature goes higher than 5 degrees above the set temperature, and will stay active until the temperature goes below the exact set point. If thermostat T1 and 12 are not active, which occurs whenever the temperature is below a selected minimum temperature, the heater is turned on at 238. If thermostat T2 is active, and the heater timer is on at 240, the heater will be turned on, or will remain on at 238. If the heater timer is not on at 240, and a heater manual request is not received at 242, the heater will turn off at 234. If the heater timer is not on at 240, and a heater manual request is received at 242, the heater timer will be turned on at 244, and the heater will be turned on at 238.

The manual heater mode is in addition to the automatic thermostat control, and can be used by an operator to defog or defrost an outdoor dome bubble. The heater timer prevents heat from being applied to a dome for a sustained period of time. Thermostat T1 can be set to, for example, about 35.7 degrees C., with about 5 degrees of hysteresis so that it turns the heater element on at about 35.7, but will not turn off until 40.7 degrees C. T2, can be set to about 21.8 degrees C., with about 5 degrees of hysteresis so that it turns on at 21.8, but will not turn off until 26.8 degrees C. In effect, if the heater timer is on at 240, then the heater element is controlled by thermostat T1, and if not, thermostat T2 controls the heater element. The user can thus manually select a higher temperature range for a pre-set amount of time. This will cause the dome internal temperature to rise to the new level, therefore the air blowing over the bubble will be warmer by about 14 degrees for the numbers used hereinabove, for example.

De-fogging is accomplished by switching between the two thermostats T1 and T2 by manually cycling the heater on and off over a period of time. This will cause a large temperature change within the dome causing the moisture saturated air inside the dome to expand and exit through the mounting openings. When the cycle reverses, the air inside contracts bringing in cold dry external air which is then heated and is no longer saturated with moisture. The de-fogging can be accomplished automatically by cycling between the two thermostats T1 and T2.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method for controlling a stepper motor in a video surveillance camera dome, comprising: decoding a command for a camera action; setting a state of a state machine based upon a decoded command; instructing a position control process and a speed control process based upon the state of said state machine, said speed control process sending a speed control signal to said position control process; sending a drive signal from said position control process to a motor current process and a phase control process to generate current and phase signals to control the stepper motor.

2. The method of claim 1 wherein said state machine includes a manual mode in which instructions to said position control process and said speed control process include camera speed and direction.

3. The method of claim 1 wherein said state machine includes a target mode in which instructions to said position control process and said speed control process include a desired camera location.

4. The method of claim 1 wherein the stepper motor is controlled with a non-linear drive current.

5. The method of claim 4 wherein said speed control signal includes ramp up and ramp down speed control for gradually increasing motor speed and gradually decreasing motor speed, respectively.

6. A method for detecting a plurality of pan positions in a stepper motor driven panable video surveillance camera of the type having a home sensor and detector to detect a home pan position and setting a pan motor step count to a known value at the home position, comprising: placing a plurality of position sensors and a home sensor in a spaced relation on a slip ring assembly of the panable video surveillance camera; detecting each of said position sensors and said home sensor by a detector positioned in a preselected location during panning of the video surveillance camera, each of said position sensors and said home sensor having an associated desired pan motor step count when detected; resetting the pan motor step count to the desired motor step count at each of said position sensor locations and said home sensor location when detected, wherein during panning of the video surveillance camera where the camera is not panned through a full pan range of motion to detect the home sensor, at least one of said position sensors is detected and used to reset the pan motor step count to the desired pan motor step count.

7. The method of claim 6 further comprising: determining the difference between the desired pan motor step count and the pan motor step count at each of said position sensor locations and said home sensor location when detected; storing the difference in the desired step count to the motor step count at each of said position sensor locations and said home sensor location when detected.

8. A method for detecting a plurality of tilt positions in a stepper motor driven tiltable video surveillance camera of the type having a home sensor and detector to detect a home tilt position and setting a tilt motor step count to a known value at the home position, comprising: placing a plurality of position sensors and a home sensor in a spaced relation on a tilt assembly of the tiltable video surveillance camera; detecting each of said position sensors and said home sensor by a detector positioned in a preselected location during tilting of the video surveillance camera, each of said position sensors and said home sensor having an associated desired tilt motor step count when detected; resetting the tilt motor step count to the desired motor step count at each of said position sensor locations and said home sensor location when detected, wherein during tilting of the video surveillance camera where the camera is not tilted through a full tilt range of motion to detect the home sensor, at least one of said position sensors is detected and used to reset the tilt motor step count to the desired tilt motor step count.

9. The method of claim 8 further comprising: determining the difference between the desired tilt motor step count and the tilt motor step count at each of said position sensor locations and said home sensor location when detected; storing the difference in the desired step count to the motor step count at each of said position sensor locations and said home sensor location when detected.

10. An apparatus for controlling a stepper motor in a video surveillance camera dome, comprising: means for decoding a command for a camera action; means for setting a state of a state machine based upon a decoded command; means for instructing a position control process and a speed control process based upon the state of said state machine, said speed control process sending a speed control signal to said position control process; means for sending a drive signal from said position control process to a motor current process and a phase control process to generate current and phase signals to control the stepper motor.

11. The apparatus of claim 10 wherein said state machine includes a manual mode in which instructions to said position control process and said speed control process include camera speed and direction.

12. The apparatus of claim 10 wherein said state machine includes a target mode in which instructions to said position control process and said speed control process include a desired camera location.

13. The apparatus of claim 10 wherein the stepper motor is controlled with a non-linear drive current.

14. The apparatus of claim 13 wherein said speed control signal includes ramp up and ramp down speed control for gradually increasing motor speed and gradually decreasing motor speed, respectively.

15. An apparatus for detecting a plurality of pan positions in a stepper motor driven panable video surveillance camera of the type having a home sensor and detector to detect a home pan position and setting a pan motor step count to a known value at the home position, comprising: means for placing a plurality of position sensors and a home sensor in a spaced relation on a slip ring assembly of the panable video surveillance camera; means for detecting each of said position sensors and said home sensor by a detector positioned in a preselected location during panning of the video surveillance camera, each of said position sensors and said home sensor having an associated desired pan motor step count when detected; means for resetting the pan motor step count to the desired motor step count at each of said position sensor locations and said home sensor location when detected, wherein during panning of the video surveillance camera where the camera is not panned through a full pan range of motion to detect the home sensor, at least one of said position sensors is detected and used to reset the pan motor step count to the desired pan motor step count.

16. The apparatus of claim 15 further comprising: means for determining the difference between the desired pan motor step count and the pan motor step count at each of said position sensor locations and said home sensor location when detected; means for storing the difference in the desired step count to the motor step count at each of said position sensor locations and said home sensor location when detected.

17. The apparatus of claim 15 wherein said means for resetting the pan motor step count to the desired motor step is performed in a complex programmable logic device.

18. An apparatus for detecting a plurality of tilt positions in a stepper motor driven tiltable video surveillance camera of the type having a home sensor and detector to detect a home tilt position and setting a tilt motor step count to a known value at the home position, comprising: means for placing a plurality of position sensors and a home sensor in a spaced relation on a tilt assembly of the tiltable video surveillance camera; means for detecting each of said position sensors and said home sensor by a detector positioned in a preselected location during tilting of the video surveillance camera, each of said position sensors and said home sensor having an associated desired tilt motor step count when detected; means for resetting the tilt motor step count to the desired motor step count at each of said position sensor locations and said home sensor location when detected, wherein during tilting of the video surveillance camera where the camera is not tilted through a full tilt range of motion to detect the home sensor, at least one of said position sensors is detected and used to reset the tilt motor step count to the desired tilt motor step count.

19. The apparatus of claim 18 further comprising: means for determining the difference between the desired tilt motor step count and the tilt motor step count at each of said position sensor locations and said home sensor location when detected; means for storing the difference in the desired step count to the motor step count at each of said position sensor locations and said home sensor location when detected.

20. The apparatus of claim 18 wherein said means for resetting the tilt motor step count to the desired motor step is performed in a complex programmable logic device.

* * * * *